Aug. 4, 1942.  G. E. BEHNKE  2,292,036
BEARING FOR DRILL BITS
Filed June 28, 1940
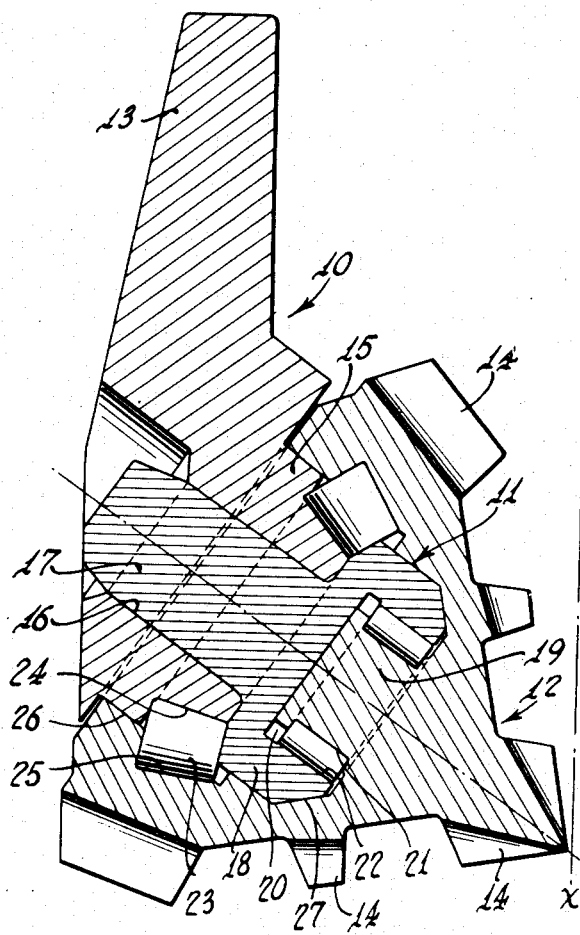
INVENTOR
Guy E. Behnke.
BY
Raymond G. Mullee
ATTORNEY Patented Aug. 4, 1942

2,292,036

UNITED STATES PATENT OFFICE 2,292,036

BEARING FOR DRILL BITS

Guy E. Behnke, Oklahoma City, Okla., assignor to Chicago Pneumatic Tool Company, New York, N. Y., a corporation of New Jersey Application June 28, 1940, Serial No. 342,897

4 Claims. (Cl. 255—71)

This invention relates generally to drill bit assemblies for use in earth boring operations and more particularly to a roller cutter organization in which a novel and effective bearing is obtained for the cutter.

The useful life of a cutter of this type is frequently determined by the durability of the bearings upon which it rotates since the teeth of a cutter are often sufficiently sharp for effective work after the bearings are so badly worn as to make the bit assembly unsafe for further use. Usually the weakest part of a cutter supporting spindle, or bearing, is its inner end which lies close to the apex of the cutter and is necessarily of a reduced diameter with respect to the base of the spindle. In the usual bit assembly, the periphery of the inner end of the spindle serves as a bearing surface cooperative either directly or through rolling bearings with the inner periphery of the cutter. The periphery of the spindle being convex, the bearing surface at the inner end of the spindle is easily spalled, chipped or broken down and its life as a useful bearing is relatively short.

The present invention has particular reference to the bearing construction adjacent the apex of the cutter and contemplates a reversal of the usual construction in that the inner bearing surface, of convex shape, is formed as an integral part of the cutter while the outer bearing surface, of concave shape is formed in the inner end of the stationary spindle. This is accomplished through the provision of a stud, fixed to the inner periphery of the cutter in axial alignment with the apex of the cutter, and a recess formed in the inner end of the spindle and adapted to receive the stud.

One object of the invention is to increase the useful life of a bit assembly by increasing the durability of its bearing.

Another object of the invention is to strengthen the bearing construction adjacent the apex of the cutter by increasing the area of the stationary bearing surface and making the surface concave in shape.

A further object is the provision of a better distribution of loads between two spaced sets of rolling bearings. According to this invention, the inner row sustains loads at a point closer to the bit axis and further away from the other row of bearings than heretofore.

Other objects and structural details of this invention will be more apparent from the following description when read in conjunction with the accompanying drawing, which is a view in longitudinal section through the bit assembly of the invention.

Referring to the drawing, the bit assembly is seen to comprise a spindle support 10, a spindle 11 secured to the support 10 and angularly disposed with respect to the support, and a substantially cone shaped cutter 12 rotatably mounted on the spindle 11. The spindle support 10 has an upwardly extending shank 13 by which the bit assembly is connected to a rotary drill head. The vertical axis of the drill head is represented by the broken line X—X, and, upon rotation of the head, the bit assembly is caused to revolve around the axis X—X. With the assembly in working position on the bottom of a drill hole, such a movement imparts a rolling motion to the cutter 12 causing the teeth 14 thereof to cut into and disintegrate the earth formation below the drill.

The base of the spindle support 10 is formed with an inwardly extending projection 15 having an axial bore 16 extending therethrough. The shank 17 of the spindle 11 is positioned within the bore 16, and the outer end of the shank has a welded engagement with the rear of the support 10 to secure the spindle against relative movement. The inner end of the spindle 11 is enlarged to form a circular head 18 which abuts against the inner end of projection 15. The cutter 12 is mounted upon the spindle 11 with its longitudinal axis aligned with the longitudinal axis of the spindle and the inner periphery of the cutter is shaped to receive the spindle and projection 15 with a loose fit. Integral with the cutter 12 and extending into the interior thereof in axial alignment with the spindle 11 is a stud 19. The stud 19 projects into and is enclosed within a circular recess 20, formed in the spindle head 18 and opening through the inner face thereof. An annular groove 21 is cut in the periphery of the stud 19 and a set of cylindrical roller bearings 22 is positioned within the groove 21 between the stud 19 and the inner periphery of spindle head 18. A second set of bearings, indicated at 23 and frusto-conical in shape, is provided in the assembly adjacent the base of the cutter. A raceway for the bearings 23 is formed by complementary grooves 24 and 25 in the outer periphery of projection 15 and the inner periphery of cutter 12 respectively. The grooves 24 and 25 taper inward toward the longitudinal axis of the cutter 12 and the bottom of the raceway which they form is closed by the outer face of spindle head 18. The top of the raceway is closed by the base of projection 15 and the base of cutter 12 which have a frictional engagement above the grooves 24 and 25, along the area 26.

The considerable force with which the bit assembly is pressed downward into engagement with the work sets up opposing forces or thrusts delivered in upward and outward directions by the cutter. The upward thrust is borne principally by the bearings 22 and 23 and is delivered to the former through the stud 19 near the apex of the cutter and to the latter through the base of the cutter. Since the stud 19 rotates with the cutter no opportunity is afforded for concentrated wear at any point on the periphery of the stud and the life of the bearing is thereby extended. The spindle 11 being stationary, wear is not distributed evenly around the inner periphery of the head 18 but the relatively larger bearing area and concave form of this surface offers a more effective resistance to wear and spalling than would a stationary bearing of smaller diameter having a bearing surface convex in shape. Another advantage of this front bearing construction arises from the fact that the load is carried on the top of the bearing. Since the cutter axis is inclined the upper bearing surface lies closer to the drill axis X—X than does the lower bearing surface and the distance between the load carrying surface of the two sets of bearings 22 and 23 is thereby increased and a better distribution of the drilling load obtained.

Under usual load conditions, the roller bearings provided in this construction are ample to provide sufficient life and strength to the assembly. However, occasional impacts are encountered during normal drilling operations which can exceed the load carrying capacity of the roller bearings. Although these excessive forces are only momentarily applied they have an injurious effect on the roller bearings. In the present construction, the outer periphery of the spindle head 18 is permitted to contact the inner periphery of the cutter. This furnishes an auxiliary bearing surface which lies directly between the supporting centers of the sets of bearings 22 and 23. Under normal conditions this friction bearing surface wears more rapidly than the roller bearings, which prevents undue friction but allows a slight contact at all times which is maintained through wear. This contact not only assists in carrying some of the normal drilling loads but also acts to protect the roller bearings when impact loads are encountered. The outer end of the spindle head 18 is tapered inward to form a shoulder 27 which partly absorbs the outward thrust of the cutter.

The cutter 12 is held in position on the bit assembly by the roller bearings 23. In assembling the bit, the cylindrical bearings 22 are first placed within the groove 21 and the spindle 11 is then arranged within the cutter with the spindle head 18 enclosing the stud 19. The tapered bearings 23 may then be disposed in the base groove 25 and the cutter assembly joined to the spindle support 10 by passing the shank 17 of spindle 11 through the bore 16 of the support.

It will be evident that the bit assembly disclosed may be modified in many respects without departing from the spirit of the invention. For example, the spindle 11 functions as an integral part of the projection 15 and might easily be formed as an extension thereof instead of as a separate element. In such a construction the roller bearings 23 could be inserted into their raceway through an opening in the base of the cutter or in any other suitable manner taught by the prior art.

What is claimed is:

1. A drill bit assembly comprising a roller cutter having a recess opening through one end thereof, a spindle extending into said recess for the support of said cutter, a stud integral with said cutter and projecting into said cutter recess, an enlarged head formed on said spindle and having a recess adapted to receive said inwardly projecting stud, complementary bearing surfaces formed on the inner periphery of said spindle head and the periphery of said stud, said bearing surfaces extending in a direction parallel to the longitudinal axis of said cutter, and auxiliary complementary bearing surfaces formed on the outer periphery of said spindle head and the inner periphery of said cutter, said auxiliary bearing surfaces extending in a direction parallel to the longitudinal axis of said cutter through a portion of their length and tapering inward toward the longitudinal axis of said cutter through another portion of their length.

2. A drill bit assembly comprising a generally cone shaped roller cutter having a recess opening through the base thereof, a spindle extending into said recess for the support of said cutter, means providing a bearing between said spindle and said cutter adjacent the base of said cutter, said means including rolling bearings interposed between the inner periphery of said cutter and the outer periphery of said spindle, and means providing a bearing between said cutter and said spindle adjacent the apex of said cutter, said means including a stud fixed within the inner periphery of said cutter and a complementary recess within said spindle adapted to receive said stud.

3. A drill bit assembly comprising a generally cone shaped roller cutter having a recess opening through the base thereof, a spindle extending into said recess for the support of said cutter, means providing a bearing between said spindle and said cutter adjacent the base of said cutter, said means including rolling bearings interposed between the inner periphery of said cutter and the outer periphery of said spindle, means providing a bearing between said cutter and said spindle adjacent the apex of said cutter, said means including a stud fixed within the inner periphery of said cutter and a complementary recess within said spindle adapted to receive said stud, and complementary bearing surfaces on the inner periphery of said cutter and the outer periphery of said spindle at a point intermediate the load supporting centers of said first and second mentioned bearings.

4. A drill bit assembly comprising a generally cone shaped roller cutter having a recess opening through the base thereof, a spindle extending into said recess for the support of said cutter, a stud fixed to the inner periphery of said cutter in axial alignment with the apex of said cutter, a recess within the inner end of said spindle adapted to receive said stud, and a plurality of complementary bearing surfaces on said spindle and said cutter including; spaced surfaces on the periphery of said stud and the wall of said spindle recess forming a raceway for the reception of rolling bearings, spaced surfaces on the inner periphery of said cutter and the outer periphery of said spindle forming another raceway for the reception of rolling bearings, said second mentioned spaced surfaces being located between said first mentioned spaced surfaces and the base of the cutter, and complementary surfaces on the inner periphery of said cutter and the outer periphery of said spindle at a point intermediate the load supporting centers of said first and second mentioned bearings, said last named surfaces extending in a direction parallel to the longitudinal axis of said cutter through a portion of their length and tapering inward toward the longitudinal axis of said cutter through another portion of their length.

GUY E. BEHNKE.